(12) United States Patent
Irvine

(10) Patent No.: US 7,268,676 B2
(45) Date of Patent: Sep. 11, 2007

(54) ACTUATED BRAKING AND DISTANCE SENSING SYSTEM FOR OPERATIONAL REGULATION OF BELT LOADER EQUIPMENT

(76) Inventor: Spencer Irvine, 760 Jennifer Ct., Lake Forest, IL (US) 60045

( * ) Notice: Subject to any disclaimer, the term of this patent is extended or adjusted under 35 U.S.C. 154(b) by 198 days.

(21) Appl. No.: 10/939,780

(22) Filed: Sep. 13, 2004

(65) Prior Publication Data

US 2006/0055520 A1    Mar. 16, 2006

(51) Int. Cl.
*B60Q 1/00* (2006.01)
(52) U.S. Cl. .................. 340/436; 340/686.1; 340/665; 198/301
(58) Field of Classification Search ............... 340/436, 340/686.1, 687, 686.4, 665, 435, 679; 198/304, 198/315, 316.1, 301; 701/45, 70
See application file for complete search history.

(56) References Cited

U.S. PATENT DOCUMENTS

| | | | |
|---|---|---|---|
| 3,694,724 A * | 9/1972 | Eggert, Jr. .................. 318/648 |
| 3,744,588 A | 7/1973 | Nave, Sr. | |
| 3,923,330 A | 12/1975 | Viall, Sr. et al. | |
| 3,945,672 A | 3/1976 | Wong | |
| 4,344,200 A * | 8/1982 | Farr et al. .................... 14/71.5 |
| 4,620,629 A * | 11/1986 | Dean ........................ 198/836.1 |
| 4,782,938 A * | 11/1988 | Cooper et al. .............. 198/301 |
| 4,802,548 A | 2/1989 | Kausch | |
| 4,886,413 A * | 12/1989 | Leon .......................... 414/495 |
| 5,013,204 A * | 5/1991 | Leon .......................... 414/347 |
| 5,101,927 A | 4/1992 | Murtuza | |
| 5,143,194 A * | 9/1992 | Sang ......................... 198/301 |
| 5,229,975 A * | 7/1993 | Truesdell et al. ........... 367/107 |
| 5,748,477 A | 5/1998 | Katoh | |
| 5,952,939 A | 9/1999 | Nakazawa et al. | |
| 6,755,296 B2 * | 6/2004 | Elwell ........................ 198/304 |
| 7,033,125 B2 * | 4/2006 | Thogersen .................. 414/345 |
| 7,077,615 B2 * | 7/2006 | Thogersen et al. ......... 414/346 |

* cited by examiner

*Primary Examiner*—Toan N. Pham
(74) *Attorney, Agent, or Firm*—Myers & Kaplan, LLC; Ashish D. Patel, Esq.; Barry E. Kaplan, Esq.

(57) ABSTRACT

An actuated braking and distance sensing system for operational regulation of belt loader equipment and/or other applicable ground support equipment, wherein the present invention incorporates, among other embodiments, spring-responsive actuated emergency braking and distance sensing systems, emergency braking and distance sensing systems implemented via linear variable displacement transducers, and/or emergency braking and distance sensing systems actuated via sonar, lasers and/or infrared sensors. Structural incorporation of the afore-referenced emergency braking and distance sensing systems within airline ground support equipment, particularly belt loader equipment, seeks to effectively reduce accidental collision of such ground support equipment with parked aircraft.

21 Claims, 7 Drawing Sheets

ACTUATED BRAKING AND DISTANCE SENSING SYSTEM FOR OPERATIONAL REGULATION OF BELT LOADER EQUIPMENT

TECHNICAL FIELD

The present invention relates generally to vehicular operating systems, and more specifically to an actuated braking and distance sensing system for operational regulation of belt loader equipment. The present invention is particularly applicable within the aircraft ground support industry for effectively reducing accidental collision of vehicular ground support equipment (i.e., belt loader equipment) with parked aircraft.

BACKGROUND OF THE INVENTION

In both the public and private aircraft industry, efficient ground support operation is paramount, and often determinative, in the successful and timely fulfillment of flight scheduling requirements, and thus, overall consumer demands. Indeed, delayed flights, departures and arrivals alike, may often be aptly attributed to unintentional deviations in ground support standards and/or procedural operations. Unfortunately, such delays typically create much angst amongst already fatigued travelers and, thus, often negatively impact upon future consumer reflection and/or dependency on a particular airline. Needless to say, recurrent delays in such business operations can have a devastating affect on the viability of an airline.

Many airline delays arising from errors and inefficiencies in ground support operations are largely the result of misjudgments made in the operation of vehicular ground support equipment. That is, such vehicular ground support equipment, which may include tractors, deicing equipment and belt loaders, must typically come within close proximity to a parked aircraft. Accordingly, human error, primarily in the form of misjudgments and miscalculations in the operational and physical parameters of such equipment, often causes accidental collision of the vehicular ground support equipment with the parked aircraft. Such is particularly the case with belt loader equipment, wherein the operator must steadily maneuver and position a relatively lengthy belt or conveyor arm proximate to the baggage or cargo doors of an aircraft, whilst maintaining the distal end of the conveyor arm a sufficient distance from the aircraft body. As may be evident, such belt loader operation and maneuvering often requires multiple airline ramp technicians to effectively assist in visually guiding the equipment operator toward the aircraft, and in his/her positioning of the belt/conveyor arm proximate thereto. Unfortunately, such a process is highly labor-intensive and often still results in collision between the belt arm and aircraft body.

As such, and typically pursuant to standard airline protocol, the effect of such a collision or impact on the structural integrity and overall mechanics of the aircraft must be thoroughly assessed and, if applicable, accordingly serviced and repaired, prior to releasing the aircraft for subsequent operation. Consequently, repeat accidents of the foregoing nature can literally cost an airline hundreds of millions of dollars per year in lost revenue, either due to the shear inability to provide flights due to a low volume of available operational aircraft, and/or due to consumer refusal to pay inflated ticket prices implemented by the airline administration in an effort to cover the expenses arising from such accidents.

Although most vehicular ground support equipment, including belt loaders, comprise some form of impact-reducing or collision-buffering assembly, such as rubber padded bumpers formed at the distal end of a belt loader arm, most such assemblies are typically limited in the ability to effectively absorb and disperse the structural shock delivered from high impact collisions between the vehicle, or components thereof, and the parked aircraft. Even still, minor impacts can, and often do, cause significant, albeit facially undetectable, internal structural damage to the aircraft; thereby, necessitating the afore-described airline servicing protocol.

Therefore, it is readily apparent that there is a need for an actuated braking and distance sensing system for operational regulation of belt loader equipment and/or other applicable ground support equipment, wherein the present braking and sensing system effectively gauges, regulates and governs the operational distance and parameters of a selected piece of ground support equipment, and/or a structural component thereof, from the surface of an aircraft. There is a further need for such a braking and sensing system that actuates auditory and visual warning systems and, ultimately, an emergency braking system so as to automatically, and without human intervention, bring the equipment to a full stop prior to forceful impact and/or collision of same with the aircraft body.

BRIEF SUMMARY OF THE INVENTION

Briefly described, in a preferred embodiment, the present invention overcomes the above-mentioned disadvantages and meets the recognized need for such an invention by providing an actuated braking and distance sensing system for operational regulation of belt loader equipment and/or other applicable ground support equipment, wherein the present invention incorporates, among other embodiments, spring-responsive actuated emergency braking and distance sensing systems, emergency braking and distance sensing systems implemented via linear variable displacement transducers, and/or emergency braking and distance sensing systems actuated via sonar, lasers and/or infrared sensors. Structural incorporation of the afore-referenced emergency braking and distance sensing systems within airline ground support equipment, particularly belt loader equipment, seeks to effectively reduce accidental collision of such ground support equipment with parked aircraft.

According to its major aspects and broadly stated, the present invention in its preferred form is an actuated braking and distance sensing system for operational regulation of belt loader equipment and/or other applicable ground support equipment, comprising, in general, spring-loaded or compression-sensitive actuation mechanism adapted to initially electronically-actuate a distance sensing and warning system, and, subsequently, an emergency braking system of the belt loader vehicle or equipment.

More specifically, the present invention is an actuated braking and distance sensing system for operational regulation of belt loader equipment, wherein the present invention preferably comprises spring-loaded or compression-sensitive actuation mechanism coupled to, and incorporated within or behind, a padded bumper (or other existing bumper) disposed at the distal end of the belt arm of the belt loader vehicle/equipment. Accordingly, upon sufficient depressive contact of the padded bumper with the exterior of an aircraft body, the spring-loaded actuation mechanism preferably partially compresses and electrically-actuates an associated auditory/visual warning system. The auditory/ visual warning system preferably functions to notice or alert the operator of the belt loader equipment to apply the manual brakes of same, and bring the vehicle or equipment to a complete stop.

However, should the operator fail to heed the auditory/visual warning, and thus move the belt loader vehicle or equipment closer toward the aircraft body, further depressing the padded bumper of the belt arm thereagainst, the spring-loaded actuation mechanism preferably more fully compresses and subsequently electrically-actuates an emergency braking system so as to prevent further movement of the belt loader equipment.

In another embodiment of the present invention, an emergency braking and distance sensing system implemented via linear variable displacement transducers (LVDTs) could be utilized, wherein the LVDTs could effectively measure the constriction or compressive displacement of the padded bumper and, accordingly, actuate electrical circuits corresponding to an auditory/visual warning system and an emergency braking system. Moreover such LVDT systems could provide numerical readouts of the distance of the belt arm from the aircraft body.

In still another embodiment of the invention, an emergency braking and distance sensing system actuated via sonar, lasers and/or infrared sensors could be utilized, wherein such "non-contact" sensors could sense or interpret the horizontal and/or vertical distance of the distal end of a belt arm from the aircraft body and, accordingly, adjust the position of the belt arm therefrom via electrically-actuating the emergency braking system of the belt loader, and/or lift adjustment of the belt arm (i.e., adjusting the angular position of the belt arm).

Accordingly, a feature and advantage of the present invention is its ability to provide an actuated braking and distance sensing system for operational regulation of belt loader equipment and/or other applicable ground support equipment.

Another feature and advantage of the present invention is its ability to provide a braking and sensing system that effectively gauges, regulates and governs the operational distance and parameters of a selected piece of ground support equipment, and/or a structural component thereof, from an aircraft body.

Still another feature and advantage of the present invention is its ability to provide a braking and sensing system that actuates auditory and visual warning systems and, ultimately, an emergency braking system so as to automatically, and without human intervention, bring the equipment to a full stop prior to forceful impact and/or collision of same with an aircraft body.

Yet another feature and advantage of the present invention is its ability to provide a braking and sensing system utilizing compressive displacement of a padded bumper and associated spring-loaded mechanism to regulate the operational parameters of a belt loader.

Yet still another feature and advantage of the present invention is its ability to provide a braking and sensing system utilizing various "non-contact" sensors disposed at the distal end of a belt arm for purposes of detecting and adjusting the vertical and horizontal operational parameters, and angular position, of a belt arm relative to an aircraft body.

A further feature and advantage of the present invention is its ability to provide emergency braking and distance sensing systems implemented via linear variable displacement transducers.

These and other features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATIVE EMBODIMENTS

Figure 1:
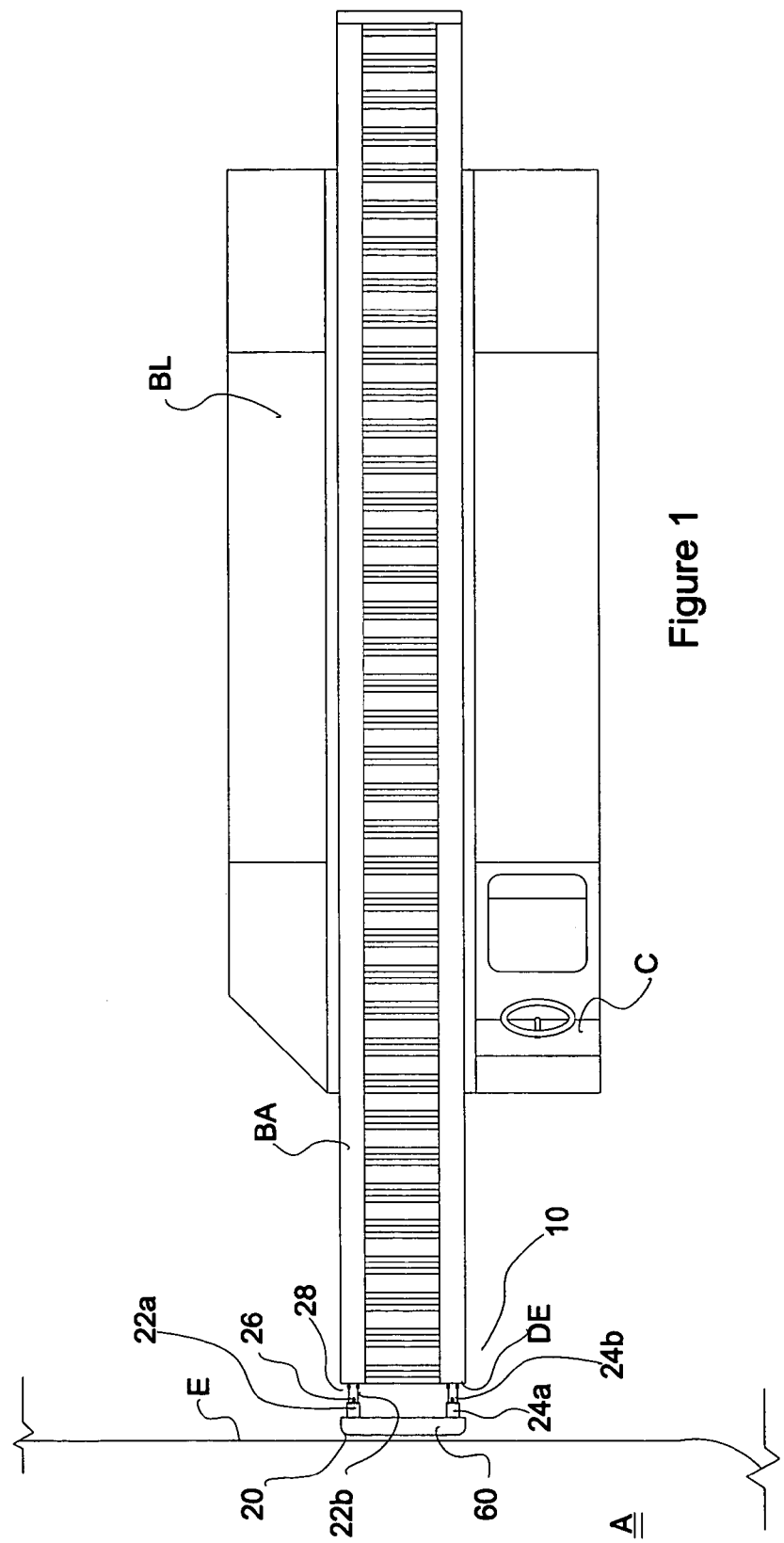
FIG. 1 is a top view of an actuated braking and distance sensing system according to a preferred embodiment of the present invention.
Figure 2:
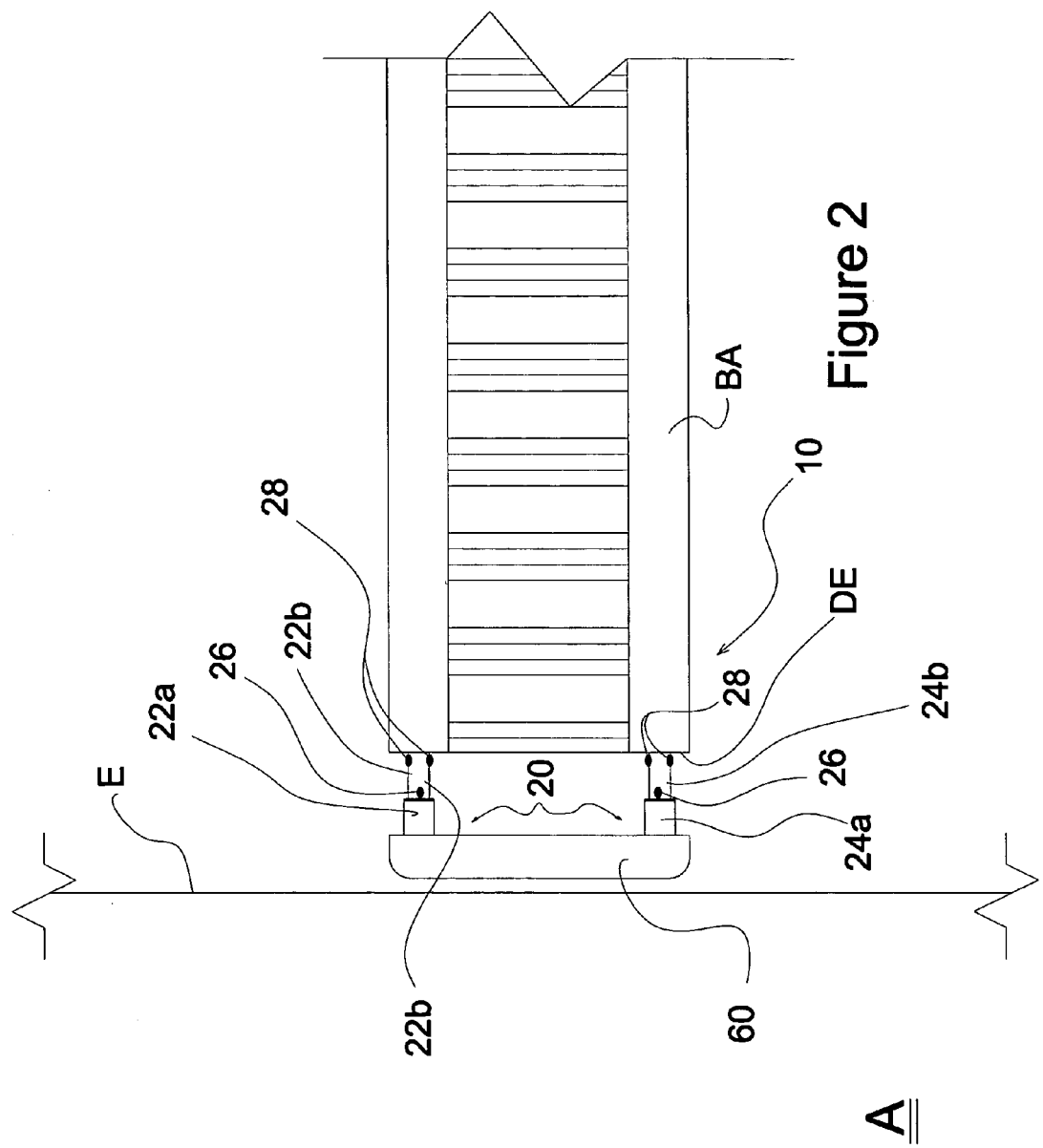
FIG. 2 is a top view of an actuated braking and distance sensing system according to a preferred embodiment of the present invention.
Figure 3:
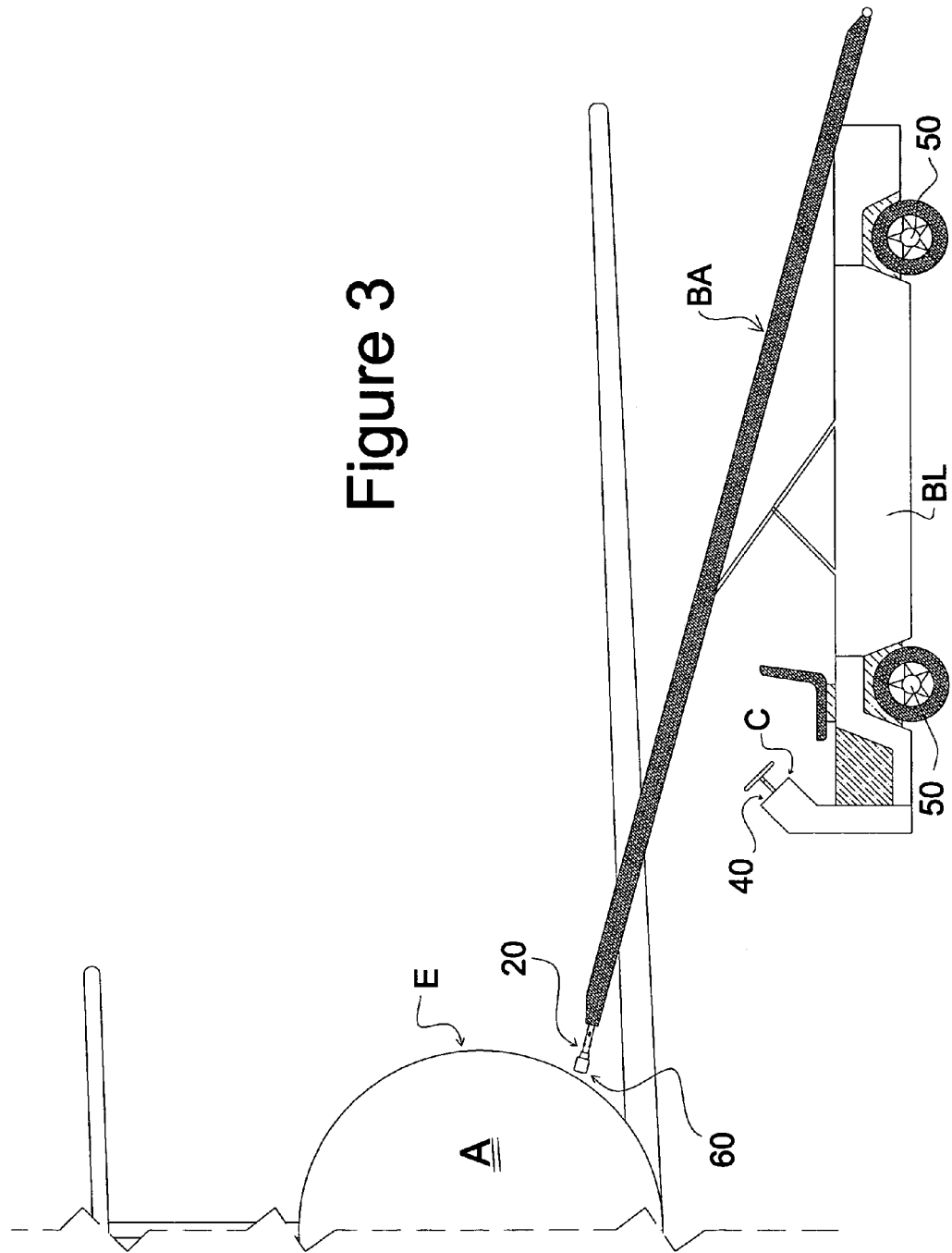
FIG. 3 is a side view of an actuated braking and distance sensing system according to a preferred embodiment of the present invention.

In describing the preferred and representative alternate embodiments of the present invention, as illustrated in FIGS. 1-7, specific terminology is employed for the sake of clarity. The invention, however, is not intended to be limited to the specific terminology so selected, and it is to be understood that each specific element includes all technical equivalents that operate in a similar manner to accomplish similar functions.

Referring now more specifically to FIGS. 1-4, the present invention in a preferred embodiment is an actuated braking and distance sensing system 10 for operational regulation of belt loader vehicles or equipment BL, and/or other applicable ground support equipment, wherein the present invention comprises spring-loaded or compression-sensitive actuation mechanism 20, associated auditory/visual warning system 40 and emergency braking system 50, and padded bumper 60. The present system 10 may be incorporated into the structural configuration or design of belt arms BA of pre-manufactured belt loaders BL, or, alternatively, may be retrofitted to existing belt loaders BL, or other suitable ground support equipment, as applicable.

Figure 4:
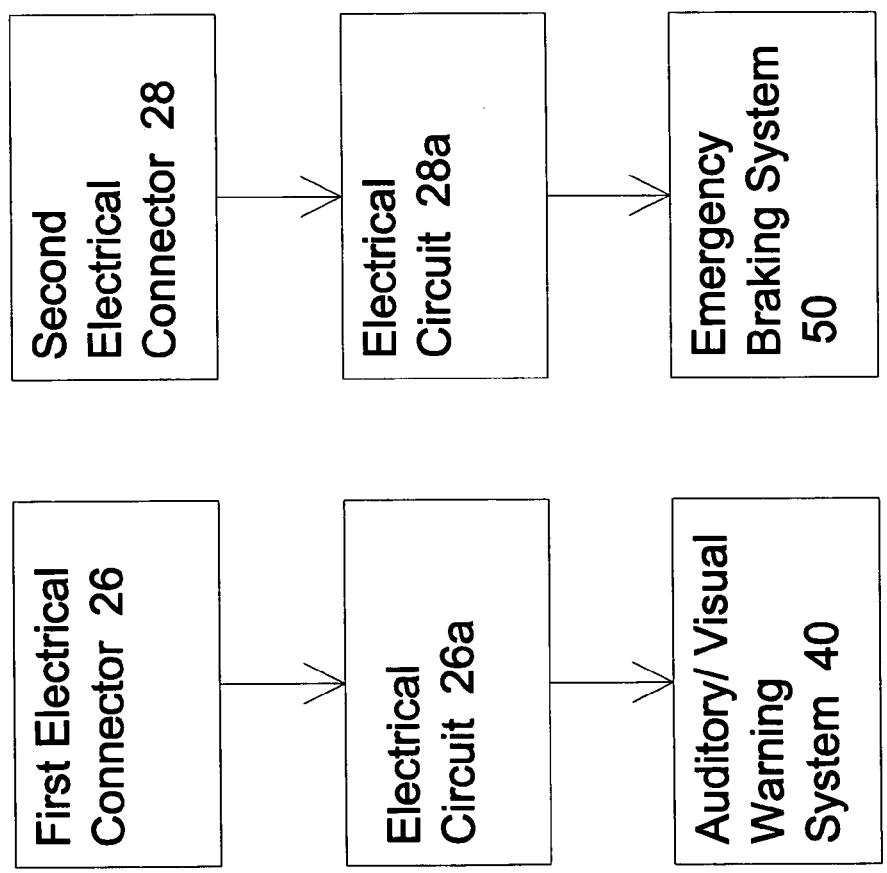
FIG. 4 is a diagrammatic representation of an actuated braking and distance sensing system according to a preferred embodiment of the present invention.

Specifically, spring-loaded or compression-sensitive actuation mechanism 20 preferably comprises first and second electrically-conductive outer tubes 22a, 24a, preferably slidably and springfully engaged over respective inner tubes 22b, 24b via compression springs, or the like, wherein inner tubes 22b, 24b preferably each comprise first and second electrical connections 26, 28 disposed thereover. As best illustrated in FIG. 4, first and second electrical connections 26, 28 are coupled to respective electrical circuits 26a, 28a dedicated to the implementation of auditory/visual warning system 40 and emergency braking system 50, respectively. Moreover, outer tubes 22a, 24a are electrically coupled to a suitable power source or the like for closing or completing the above-referenced circuits 26a, 28a.

Accordingly, electrical connections 26, 28 of each inner tube 22b, 24b are preferably arranged thereover such that compressive or slidable movement of outer tubes 22a, 24a over respective inner tubes 22b, 24b results in outer tubes 22a, 24a initially passing over first electrical connection 26, and, thereafter, over second electrical connection; thereby, completing respective circuits 26a, 28a thereof, and thus, systematically triggering or actuating auditory/visual warning system 40 and emergency braking system 50, respectively, as more fully described below.

Preferably, outer tubes 22a, 24a are secured behind padded bumper 60, wherein inner tubes 22b, 24b are preferably secured to distal end DE of belt arm BA of belt loader vehicle/equipment BL. Accordingly, spring-loaded mechanism 20 preferably extends or positions padded bumper 60 a requisite distance from distal edge DE of belt arm BA for purposes of enabling springful compression or displacement of padded bumper 60 upon depressive contact or impact of same with exterior E of aircraft body A. Preferably, such depressive contact and/or impact of padded bumper 60 with aircraft body A preferably translates into springful compressive or slidable movement of outer tubes 22a, 24a over respective inner tubes 22b, 24b; thereby, subsequently, and systematically, actuating auditory/visual warning system 40 and emergency braking system 50, as more fully described below.

It should be recognized that padded bumper 60, in conjunction with spring-based actuation mechanism 20, provide a system and assembly for effectively absorbing and dispersing minor impact resulting from collisions between belt arm BA and aircraft body A. However, more forceful impacts and/or excessive and forceful pushing or contact of distal end DE of belt arm BA with aircraft body A, preferably effectively triggers systematic actuation of auditory/visual warning system 40 and emergency braking system 50, as more fully described below. As such, to assist in reducing structural damage of any impact and/or contact of belt arm BA, particularly distal end DE thereof, with aircraft body 60, padded bumper 60 is preferably fabricated from a suitable padding substrate, such as, for exemplary purposes only, rubber, rubber-sponge composites, foam-sponge composites, and/or other suitable cushion-like materials.

Accordingly, upon sufficient depressive contact or impact of padded bumper 60 with exterior E of aircraft body A, outer tubes 22a, 24a of spring-loaded mechanism 20 preferably partially compress and pass over first electrical connections 26 of each inner tube 22b, 24b, respectively; thus, completing electrical circuit 26a thereof, and electrically-actuating associated auditory/visual warning system 40. Auditory/visual warning system 40 is preferably disposed proximate to the operator of belt loader BL, such as within the operator's cabin or control panel C of belt loader BL, so as to conveniently and promptly notice or alert the operator to apply the manual brakes of same, and bring belt loader BL to a complete stop.

However, should the operator fail to heed the auditory/visual warning elicit from warning system 40, and thus move belt loader BL closer toward aircraft body A, further depressing padded bumper 60 of belt arm BA thereagainst, outer tubes 22a, 24a preferably fully compress and pass over second electrical connections 28 of each inner tubes 22b, 24b, respectively; thereby, completing electrical circuit 28a thereof, and electrically-actuating emergency braking system 50 of belt loader BL so as to immediately stop further movement of same. Accordingly, emergency braking system 50 preferably functions as a failsafe should the operator of belt loader BL not timely apply the manual brakes of same following actuation of auditory/visual warning system 40, as described hereinabove.

Figure 5:
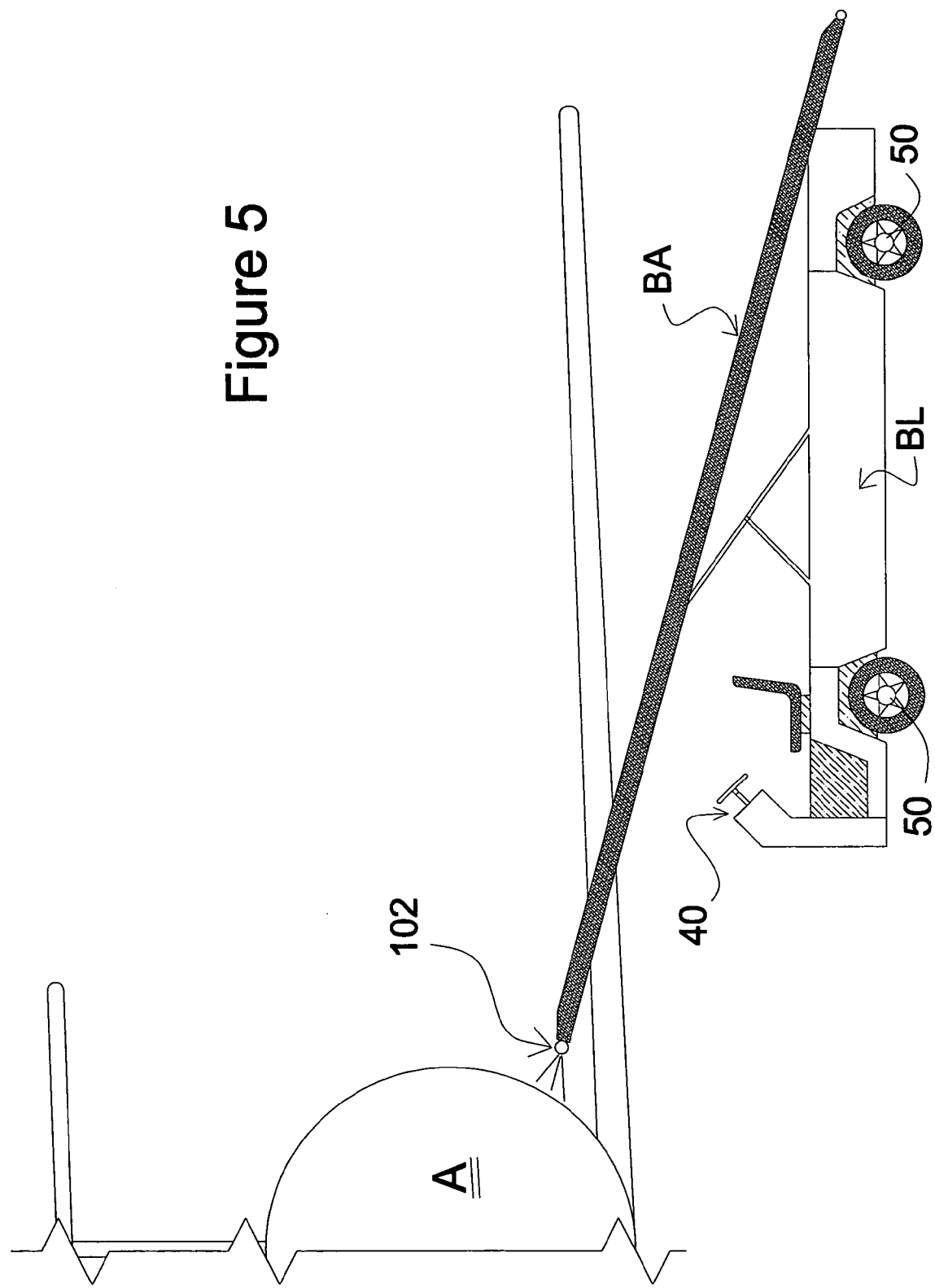
FIG. 5 is a side view of an actuated braking and distance sensing system according to an alternate embodiment of the present invention.
Figure 6:
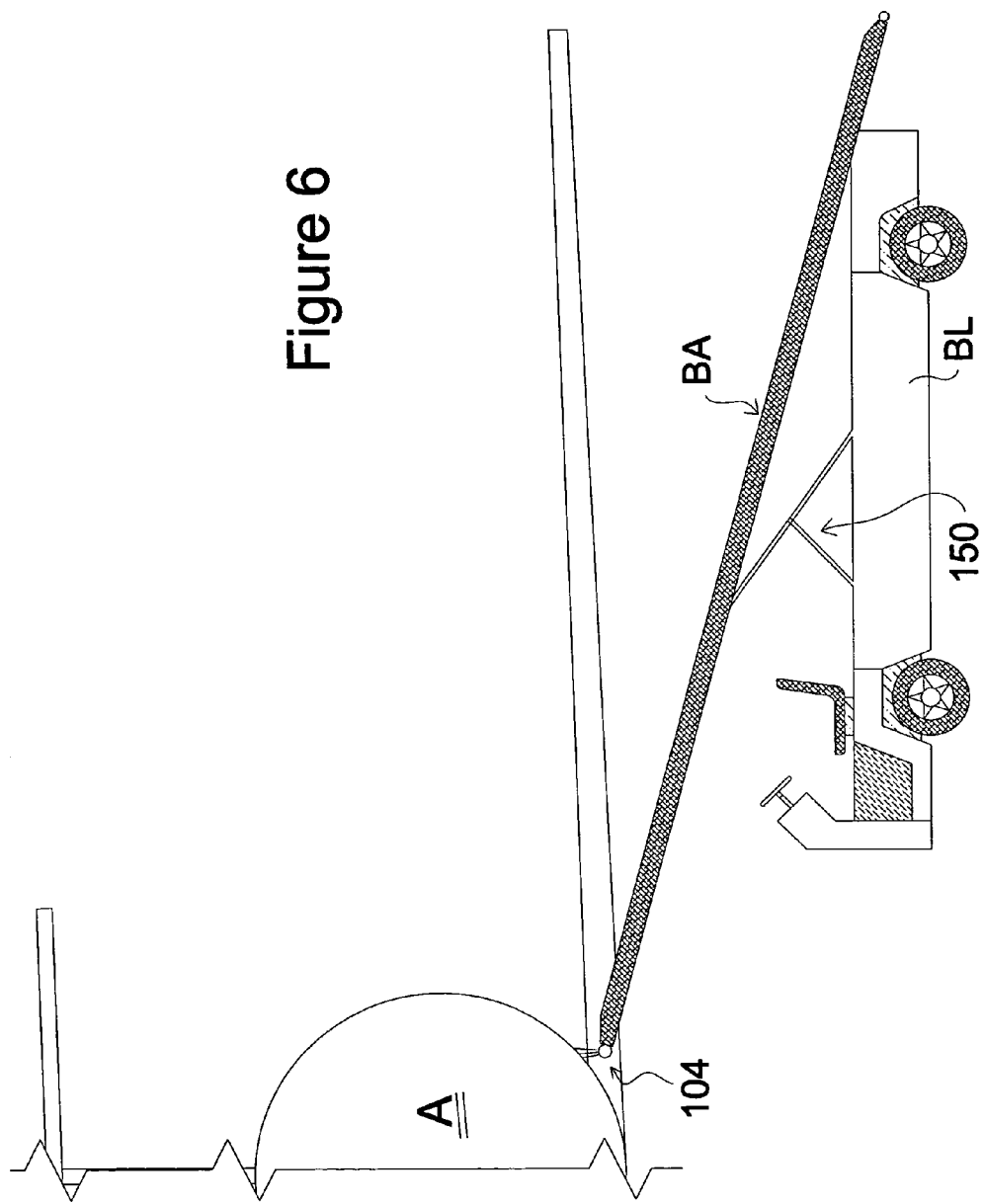
FIG. 6 is a side view of an actuated braking and distance sensing system according to an alternate embodiment of the present invention; and, FIG. 7 is a diagrammatic representation of an actuated braking and distance sensing system according to an alternate embodiment of the present invention.
Figure 7:
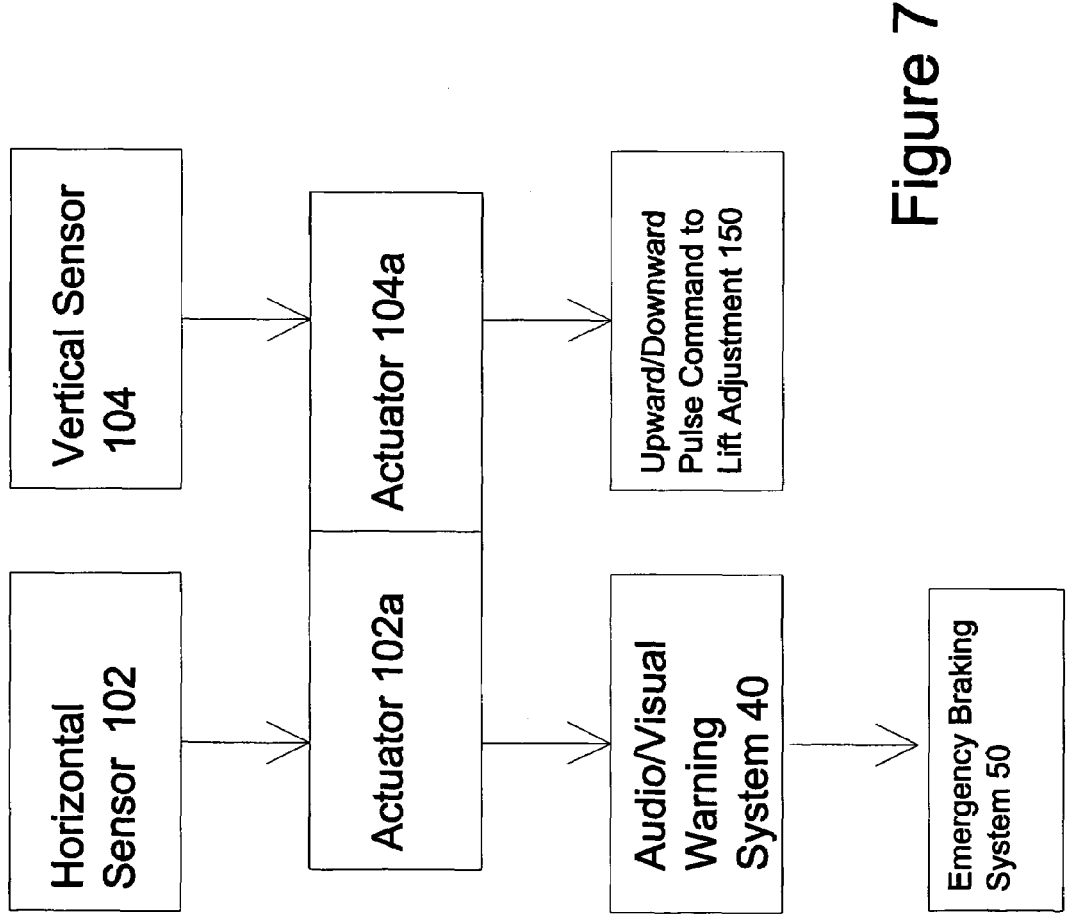

Referring now more specifically to FIGS. 5-7, illustrated therein is an alternate embodiment of system 10, wherein the alternate embodiment of FIGS. 5-7 is substantially equivalent in form and function to that of the preferred embodiment detailed and illustrated in FIGS. 1-4 except as hereinafter specifically referenced. Specifically, the embodiment of FIGS. 5-7 is an emergency braking and distance sensing system 100 actuated via "non-contact" sensor technology, such as, for exemplary purposes only, sonar, lasers and/or infrared sensors, wherein horizontal sensor 102 and vertical sensor 104 interpret, sense, or otherwise measure the distance of distal end DE of belt arm BA from exterior E of aircraft body A. As best illustrated in FIG. 7, non-contact horizontal and vertical sensors 102, 104, respectively, are electrically coupled to respective electrical circuits or actuators 102a, 104a dedicated to the actuation or implementation of auditory/visual warning system 40 and emergency braking system 50 of belt loader BL, and lift adjustment 150 of belt arm BA, respectively.

Accordingly, and as best illustrated in FIG. 5, upon approach of belt loader BL toward aircraft body A, if horizontal sensor 102 detects or measures a horizontal distance (i.e., horizontal relative to a ground surface) less than a first pre-determined or pre-programmed value, electrical circuit or actuator 102a actuates auditory/visual warning system 40; thus, noticing or alerting the operator of belt loader BL to apply the manual brakes of same and bring belt loader BL to a complete stop. If, however, the operator continues to move or drive belt loader BL closer to aircraft body A, and horizontal sensor 102 detects or measures a horizontal distance less than a second pre-determined or pre-programmed value, electrical circuit or actuator 102a subsequently actuates emergency braking system 50 of belt loader BL; thereby, bringing belt loader BL to a complete stop.

Similarly, and as best illustrated in FIG. 6, during operation or raising of belt arm BA of belt loader BL to a selected angle so as to position distal end DE thereof proximate to the cargo/baggage doors, or other surface, of aircraft body A, if vertical sensor 104 detects or measures a vertical distance (i.e., vertical relative to a ground surface) less than a pre-determined or pre-programmed value, electrical circuit or actuator 104a commands lift adjustment 150 to cease raising or lifting of belt arm BA. Alternatively, actuator 104a may initiate a downward pulse command that consequently lowers belt arm BA a pre-determined or pre-programmed amount, which is especially applicable when aircraft body A progressively lowers or settles as a result of weighty cargo/baggage being loaded therewithin. It should be recognized that actuator 104a may further initiate an upward pulse command to consequently raise belt arm BA a pre-determined or pre-programmed amount so as to accommodate for aircraft body A progressively rising as a result of weighty cargo/baggage being removed therefrom. Accordingly, vertical sensor 104 effectively adjusts the angular position of belt arm BA so as to prevent direct contact of distal end DE thereof with aircraft body A, whilst maintaining distal end DE a preferred distance therefrom. Although system 100 may be utilized or incorporated into a belt loader BL separate from system 10, as described above, it is contemplated that elements of system 100, such as vertical sensor 104 and all functions thereof, could be incorporated into system 10.

It is contemplated in an alternate embodiment of the present invention that spring-responsive or spring-based actuation mechanism 20 of emergency braking and distance sensing system 10 could be replaced via linear variable displacement transducers (LVDTs), wherein such LVDTs could effectively measure the constriction or compressive displacement of padded bumper 60 and, accordingly, actuate electrical circuits corresponding to auditory/visual warning system 40 and emergency braking system 50. Moreover such LVDT systems could provide numerical readouts of the distance of belt arm BA from aircraft body A.

Although the foregoing preferred and alternate embodiments of the present invention are described for use with belt loader equipment and/or belt loader vehicles, it should be recognized that any selected ground support equipment, vehicle, and/or structural component thereof, may be equipped with any of the afore-described preferred and/or alternate braking and distance sensing systems 10, 100, wherein such ground support equipment may include, without limitation, deicers, tractors, cleaning trucks, and the like.

It is contemplated in another alternate embodiment that any selected number of spring-load outer/inner tube assemblies, structurally and functionally equivalent to outer tubes 22a, 24a and inner tubes 22b, 24b, may be utilized to construct spring-based actuation mechanism 20.

It is contemplated in still another alternate embodiment that any selected number of "non-contact" sensors may be utilized to construct and implement system 100, as described hereinabove.

It is contemplated in yet another alternate embodiment that angularly-sensitive "non-contact" sensors may be incorporated into system 100; thereby providing angular distance measurements in conjunction with the horizontal and vertical distance measurements provided by system 100, as described hereinabove. Such an embodiment may be particularly applicable to telescoping belt arms.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. An actuated braking and distance sensing system, comprising:
   a compression-responsive actuation mechanism adapted to the belt arm of a belt loader, wherein contact or proximate distance between said belt arm and the surface of an aircraft body causes said actuation mechanism to actuate a warning system and an emergency braking system of said belt loader.

2. The system of claim 1, wherein said actuation mechanism is disposed on a structural component of the motorized apparatus.

3. The system of claim 2, wherein said actuation mechanism comprises an electrically conductive first member slidably and springfully engaged over a second member.

4. The system of claim 3, wherein said second member comprises a first electrical connection coupled to said warning system and a second electrical connection coupled to said emergency braking system.

5. The system of claim 4, wherein contact or collision of the structural component of the motorized apparatus with a selected surface causes compression of said actuation mechanism.

6. The system of claim 5, wherein compression of said actuation mechanism causes slidable movement of said first member over said first electrical connection of said second member, thereby completing an electrical circuit and actuating said warning system, said warning system adapted to audibly and visually alter an operator of the motorized apparatus to apply the manual brakes of same.

7. The system of claim 5, wherein compression of said actuation mechanism causes slidable movement of said first member over said second electrical connection of said second member, thereby completing an electrical circuit and actuating said emergency braking system.

8. The system of claim 1, wherein said actuation mechanism is disposed between a padded bumper and a structural component of the motorized apparatus.

9. An actuated braking and distance sensing system, comprising:
   a compression-responsive actuation mechanism adapted to initially actuate a warning system, and subsequently actuate an emergency braking system of an aircraft ground support vehicle, said actuation mechanism carried by a structural component of said vehicle, wherein contact or collision of said structural component with an aircraft body results in compression of said actuation mechanism, and wherein compression of said actuation mechanism systematically actuates said warning system and said emergency braking system.

10. An actuated braking and distance sensing system, comprising:
    a compression-responsive actuation mechanism; and,
    a belt loader, wherein said actuation mechanism systematically actuates a warning system and an emergency braking system of said belt loader so as to prevent collision of said belt loader with an aircraft body.

11. An actuated braking and distance sensing system for regulating the operational parameters of a belt arm of a belt loader, said system comprising:
    a non-contact sensor for detecting and measuring relative to ground surface the horizontal and vertical distance of a distal end of the belt arm from an aircraft body.

12. The system of claim 11, wherein if the horizontal distance is less than a pre-determined value, said non-contact sensor actuates a warning system to alert an operator of the belt loader to apply the manual brakes of same.

13. The system of claim 11, wherein if the horizontal distance is less than a pre-determined value, said non-contact sensor actuates an emergency braking system of the belt loader.

14. The system of claim 11, wherein if the vertical distance is less than a pre-determined value, said non-contact sensor commands a lift adjustment mechanism of the belt arm to cease upward movement of the belt arm.

15. The system of claim 11, wherein if the vertical distance is less than a pre-determined value, said non-contact sensor commands a lift adjustment mechanism of the belt arm to lower the belt arm to a vertical distance approximately equal to said pre-determined value.

16. The system of claim 11, wherein said non-contact sensor commands a lift adjustment mechanism of the belt arm to adjust the belt arm so that the distal end of the belt arm is maintained a pre-determined distance from the aircraft body.

17. The system of claim 11, wherein said non-contact sensor detects and measures, relative to a ground surface, an angular distance between the distal end of the belt arm and the aircraft body, and, accordingly, regulates the distance of the distal end of the belt arm from the aircraft body.

18. The system of claim 11, wherein said non-contact sensor is selected from a group consisting of lasers, sonar, infrared signals, and combinations thereof.

19. An actuated braking and distance sensing system for regulating the operational parameters of a belt loader having a belt arm, said system comprising:
  a non-contact sensor for detecting and measuring the distance from a surface of said belt arm of said belt loader to a selected surface of an aircraft body which is independent from said belt arm, wherein said non-contact sensor actuates an emergency braking system of said belt loader upon said belt arm reaching a pre-determined distance from the selected surface of the aircraft body.

20. The system of claim 19, wherein said non-contact sensor actuates a warning system upon said belt arm reaching a first pre-determined distance from the selected surface of the aircraft body.

21. An actuated braking and distance sensing system, comprising:
  a linear variable displacement transducer adapted to the belt arm of a belt loader for systematically actuating a warning system and an emergency braking system of said belt loader when said belt arm contacts or comes within a proximate distance to the surface of an aircraft body.

* * * * *